United States Patent Office 3,546,217
Patented Dec. 8, 1970

3,546,217
NOVEL SYMMETRICAL HETEROCYCLICLY SUBSTITUTED STILBENES AND PROCESS THEREFOR
Adolf Emil Siegrist, Basel, Peter Liechti, Binningen, Erwin Maeder, Aesch, Basel-Land, and Leonardo Guglielmetti, Birsfelden, Switzerland, assignors to Ciba Limited, Basel, Switzerland, a company of Switzerland
No Drawing. Filed Nov. 29, 1966, Ser. No. 597,529
Claims priority, application Switzerland, Dec. 2, 1965, 16,621/65
Int. Cl. C09b 23/00
U.S. Cl. 260—240                 11 Claims

ABSTRACT OF THE DISCLOSURE

A process for the manufacture of symmetrical heterocyclicly substituted stilbenes which comprises reacting a compound of the formula

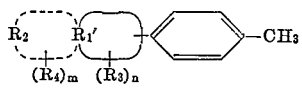

wherein $R_1'$ represents a heterocyclic moiety of aromatic character containing 5 to 6 atoms in the ring, wherein the atoms in the ring are carbon and 1 or more atoms selected from the group consisting of oxygen, sulphur and nitrogen provided that (A) said cyclic moiety contains from 1 to 4 nitrogen atoms in the ring,
(B) said cyclic moiety is free from hydrogen atoms which
   (1) are bonded to the nitrogen atoms of the ring
   (2) are replaceable by alkali metal atoms;
$R_2$ is hydrogen, benzo or naphtho
$R_3$ and $R_4$ are hydrogen or phenyl
$n$ is 0 or an integer from 1 to $q$, where $q$ is the number of hydrogen atoms attached to carbon atoms on $R_1'$
$m$ is 0 in an integer from 1 to $p$, where $p$ is the number of hydrogens attached to carbon atoms on $R_2$, with molecular oxygen in dimethylformamide in the presence of an alkali selected from the group consisting of sodium hydroxide and potassium hydroxide containing from 0 to 15 percent by weight of water at a temperature of between 10° and 150° C.

The present invention provides a process for the manufacture of heterocyclic stilbene compounds, wherein a compound of the formula (1)

in which $R_1$ represents a heterocyclic system that is free from hydrogen atoms replaceable by alkali metals and contains at least one five- or six-membered heterocycle containing a cyclic member linked directly with R and at least one nitrogen atom that is bound exclusively in the ring, and R represents a benzene residue which is bound in the 1,4-position with $R_1$ and the group $H_3C$— is reacted with molecular oxygen in a strongly polar, neutral to basic organic solvent which (a) is free from atoms replaceable by alkali metals and (b) should be substantially anhydrous, in the presence of a strongly basic alkali metal compound that may contain up to 25% by weight of water.

Within the scope of the above definition the said heterocyclic and carbocyclic systems (benzene residues, naphthalene residues) may also contain any further aliphatic, araliphatic, cycloaliphatic or aromatic substituents, provided they satisfy the condition mentioned above of being free from atoms, especially hydrogen atoms, replaceable by alkali metal atoms.

According to the variant most suitable for the practical performance of the present process compounds of the Formula 1—with the symbols having the meanings defined with reference to this formula—are reacted with molecular oxygen in dimethylformamide in the presence of sodium hydroxide or preferably potassium hydroxide.

In this reaction two molecules of the compound of the Formula 1 react at the methyl groups and form an ethylene group:

(1)
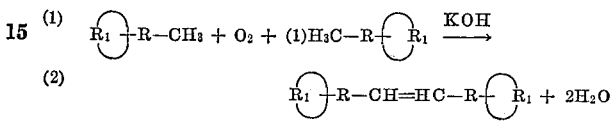

(2)

where R and $R_1$ have the meanings given them above.

The heterocyclic system $R_1$ may consist of one ring or several rings. It contains at least one heterocycle of 5 or 6 members and at least one cyclic member must be a nitrogen atom all three valences of which are saturated in the ring. The heterocycle is bound directly to R, in fact through a single bond. If the residue $R_1$ consists of several rings, it may contain in addition to at least one hetero ring preferably aromatic rings, for example benzene or naphthalene rings. In general, it is advantageous when the starting material of the Formula 1 contains one —R—$CH_3$ group capable of reacting with oxygen.

According to a preferred variant of the present process compounds of the Formula 3

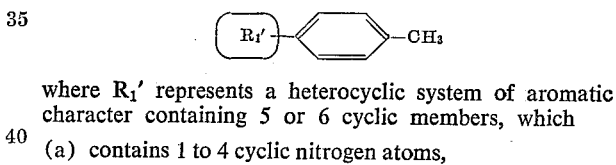

where $R_1'$ represents a heterocyclic system of aromatic character containing 5 or 6 cyclic members, which (a) contains 1 to 4 cyclic nitrogen atoms,
(b) is free from hydrogen atoms that
   (I) are bound to cyclic nitrogen atoms and
   (II) are replaceable by alkali metals,
(c) contains as further cyclic atoms also carbon atoms and may also contain oxygen or sulphur atoms in the arrangement found in known heterocyclic systems,
(d) may be condensed with a benzene or naphthalene ring or may contain one or several phenyl radicals are reacted with molecular oxygen in dimethylformamide and in the presence of potassium hydroxide containing 0 to 15% by weight of water at a temperature ranging from 10° to 150° C.

The types of compounds of the Formula 1 shown in the following list are particularly suitable starting materials for the present process:

(A) Compounds of the formula (4)
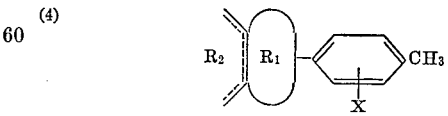

in which $R_2$ represents a benzene or naphthalene residue condensed with $R_1$ in the manner indicated by the valency lines $R_1$ represents a five- or six-membered heterocyclic system comprising a cyclic member bound directly to the methylphenyl radical and at least one nitrogen atom bound exclusively in the ring, and X represents a hydrogen atom, a chlorine atom, a methoxy group or a methyl group.

In this group of compounds there are particularly suitable triazole, oxazole and diazine compounds, for example the compounds of the following formulae:

(5) 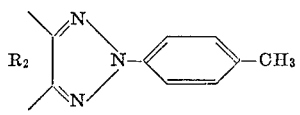

(6) 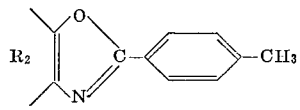

and (7) 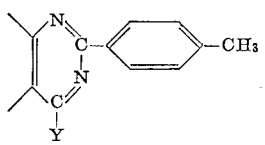

in which $R_2$ represents a benzene or naphthalene ring bound with the triazole, oxazole or diazine ring in the manner indicated by the valency lines, and Y represents a hydrogen atom or a benzene radical.

(B) Compounds of the formula (8) 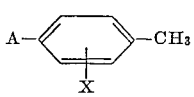

in which A represents a 2-oxazolyl, 2-oxadiazolyl, 2-thiadiazolyl, 2-(as)-triazinyl, 2-s-triazinyl or a 2- or 1-triazolyl-(1,2,3) residue which itself may further contain phenyl, naphthyl, thienyl or alkyl radicals, and X represents a hydrogen or chlorine atom, or a methoxy or methyl group.

A group of compounds of the above general formula that can be used with advantage in the present process corresponds to the formula (9) 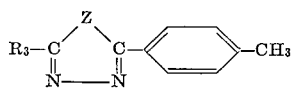

in which $R_3$ represents an aromatic or heterocyclic residue and Z an oxygen or a sulphur atom. As residue $R_3$ these oxdiazole and thiadiazole compounds contain, for example, naphthalene or benzene radicals which themselves may contain substituents, for example alkyl or alkoxy groups or halogen atoms such as chlorine. $R_3$ may also be a further heterocyclic residue, especially a thiophene residue, or a styrene residue. Particularly important compounds suitable for use in this process are the compounds of the formula

(10) 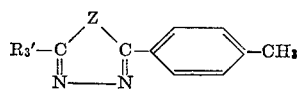

in which $R_3'$ represents a phenyl, diphenyl, naphthyl or thienyl radical and Z an oxygen or a sulphur atom, or those of the formula

(11) 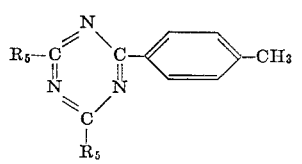

in which $R_5$ represents a phenyl radical or an alkyl-substituted phenyl or diphenyl radical.

In the above formulae of the starting materials to be used in the present process terminal phenyl and naphthyl groups may contain further substituents that are free from atoms, especially hydrogen atoms, that are replaceable by alkali metal atoms. Particularly suitable substituents for the said terminal groups are 1 to 4 alkyl groups with 1 to 6 carbon atoms (except methyl groups in para-position), a phenyl group, 1 to 2 alkoxy groups with 1 to 4 carbon atoms or halogen atoms.

From the large number of compounds suitable for use in the present process there may be mentioned the following nonlimiting examples:

(12) 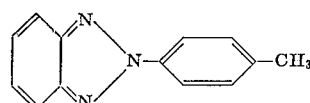

(13) 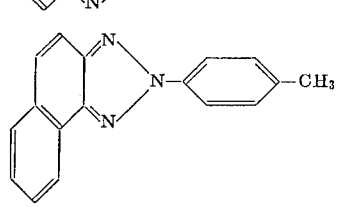

(14) 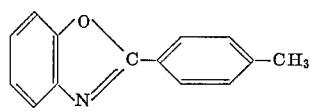

(15) 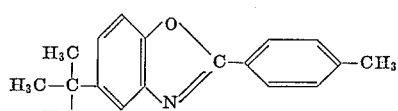

(16) 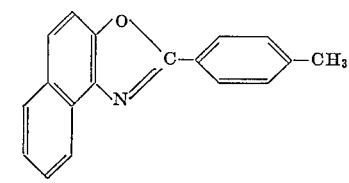

(17) 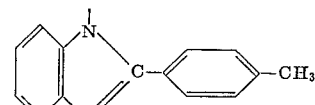

(18) 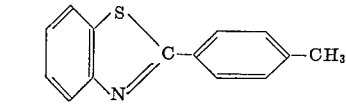

(19) 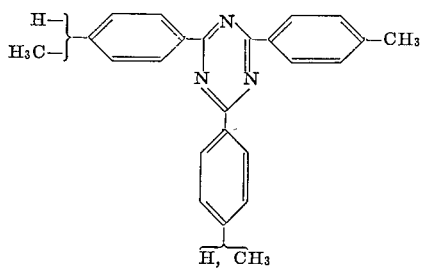

(20) 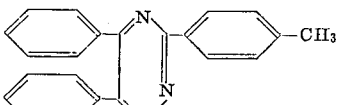

(21) 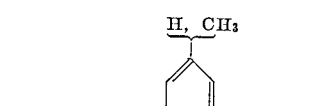

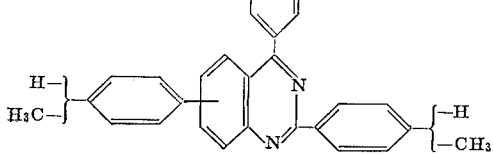

(22) 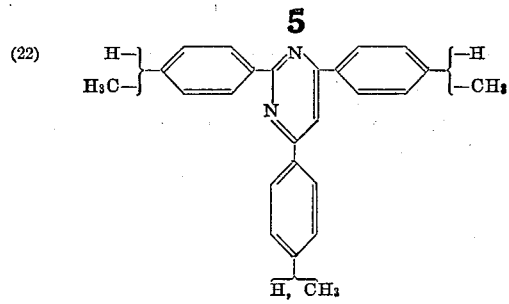

(23) 

(24) 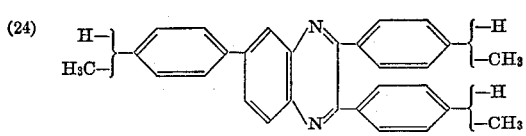

(25) 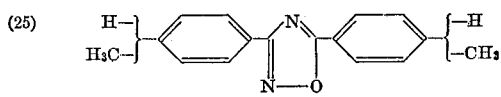

(26) 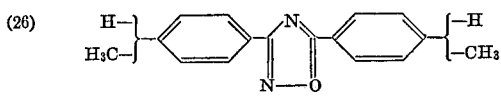

(27) 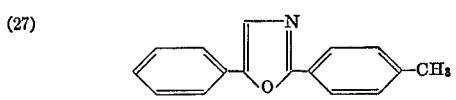

(28) 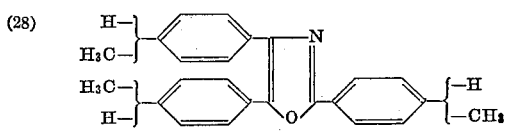

(29) 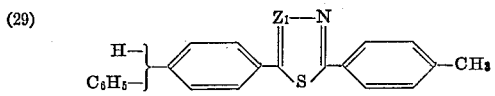

(30) 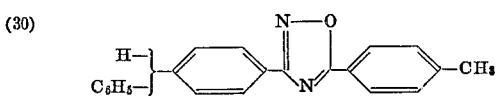

(31) 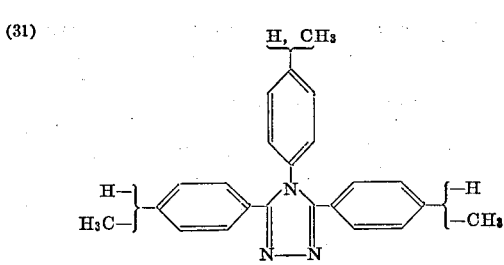

(32) 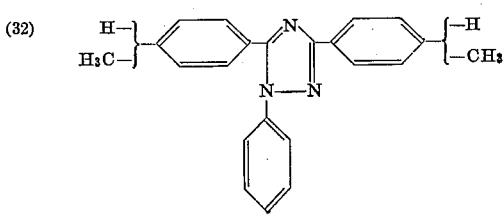

(33) 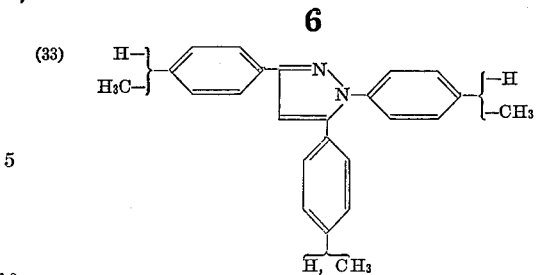

(34) 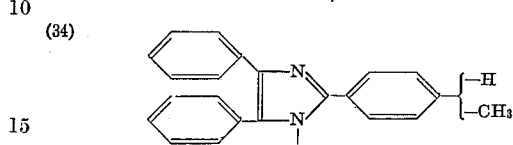

(35) 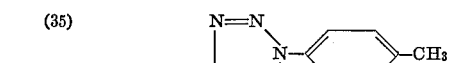

(36) 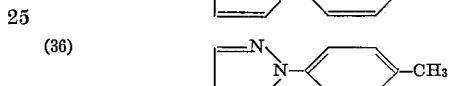

(37) 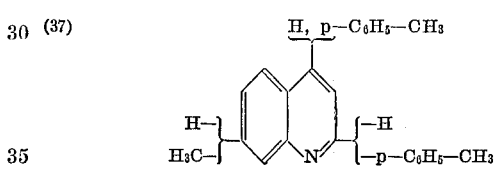

Explanations to the above formulae:

(1) Terminal phenyl radicals may contain further substituents such as alkyl (especially with 1 to 4 carbon atoms), halogen (especially chlorine) or alkoxy (especially with 1 to 4 carbon atoms).

(2) Phenyl radicals on s-triazine rings may further contain methyl groups.

(3) To the substitution products of compounds of the Formula 14 belong also the corresponding 6-phenylbenzoxazoles as well as the analogous 1- and 2-naphthoxazoles.

(4) The symbol

means that the molecule as a whole may contain either a hydrogen atom or a methyl group, but may contain only one methyl group.

(5) As in the corresponding examples $Y_1$ represents —O— or —S— and $Z_1$ represents =N— or =CH—

(6) The symbol

means that this position may be taken up either by a hydrogen atom or by a phenyl group.

As will be realized from the above summary the reaction according to this invention may in principle be carried out with all m-methylphenyl derivatives of nitrogen-heterocycles of aromatic character. Summing up in this connection the most important types should be pointed out once more, namely such derivatives of pyrrole, the pyrazoles, the triazoles (1,2,3-, 1,2,4- or 1,3,4-), of tetrazole, of pyridine, or pyrimidine, of pyrazine, of quanazoline, of quinoxaline, of the quinolines, of the triazines (1,3,5-, 1,2,4- and 1,2,3-), of the oxdiazoles (1,2,4- and 1,3,4-), of the benzoxazoles and naphthoxazoles, of the (iso)oxazoles, of the imidazoles and of the corresponding cyclic systems condensed with benzene or naphthalene rings, insofar as they have not already been mentioned above.

According to the present process the compounds of the Formula 1 are reacted with oxygen in the presence of a strongly polar, neutral to basic organic solvent that is free from atoms, especially hydrogen atoms, replaceable by alkali metal atoms. Furthermore, the solvent should as such be substantially anhydrous (except for the water content permissible for the alkali component). Such solvents are above all dialkylated acylamides, preferably those of the type

(38)    [(alkyl)₂N]_w–acyl in which "alkyl" is a lower alkyl group containing 1 to 4 carbon atoms, especially a methyl group; "acyl" is the residue of a lower carboxylic acid containing 1 to 4 carbon atoms, especially of formic or acetic acid, or of phosphoric acid, and w indicates the basicity of the acid. As important types of such solvents there may be mentioned: Dimethylformamide, diethylformamide, dimethylacetamide and hexamethyl-phosphoric acid triamide. Mixtures of solvents may likewise be used.

For the reaction also a strongly basic alkali metal compound is required. Within the cope of this invention the term "strongly basic alkali metal compounds" refers to those compounds of the alkali metals (main Group I of the Periodic Table of the Elements) including those of ammonium that have a basicity at least equal to that of lithium hydroxide. Therefore, there may be used compounds of lithium, sodium, potassium, rubidium, caesium or ammonium, for example of the type of the alcoholates, hydroxides, amides, hydrides, sulphides, or strongly basic ion exchange resins. It is advantageous to use—when in view of the reaction temperature mild reaction conditions are indicated—potassium compounds of the formula

(39)    KOC_{m−1}H_{2m−1} where $m$ is a whole number from 1 to 6, for example potassium hydroxide or potassium tertiary butylate. When alkali metal alcoholates, amides or hydrides are used, the reaction must be carried out in a substantially anhydrous medium, whereas in the case of alkali metal hydroxides a water content of up to 25% (for example water of crystallization) is permissible. In the case of potassium hydroxide a water content up to about 10% has been found advantageous. As examples of other suitable alkali metal compounds there may be mentioned sodium methylate, sodium hydroxide, sodamide, lithium amide, lithium hydroxide, rubidium hydroxide, caesium hydroxide and the like. It is, of course, also possible to use mixtures of such bases. The alkali metal hyroxide may be used in an amount from about 0.1 to 10 mols for every mol of the compound (1); preferably it is used in an amount from about 1 to 5 mols.

The molecular oxygen required for the reaction is advantageously supplied to the reaction mixture by injecting into it air, or another gas containing molecular oxygen or pure oxygen, for example at a temperature from 15° to 30° C.; during the reaction the temperature rises slightly. In general, the reaction temperature may range from 10° to 150° C., preferably from 30° to 100° C. The reaction may be promoted by heating, for example by heating the reaction mixture—when the initial rise in temperature caused by the exothermic reaction has ceased—slowly to 50° to 120° C. and then keeping it at this temperature for some time, for example for ½ to 2 hours. The reaction time depends not only on the reaction temperature but also on the oxygen content of the gas used. The final products can be isolated from the reaction mixture in the usual manner. Among the solvents dimethylformamide is particularly suitable.

According to a particularly suitable variant of the present process the reaction of compounds of the Formula 1, above all also those of the Formulae 3, 4 and 8, with molecular oxygen in dimethylformamide as solvent is carried out at a temperature from 30° to 100° C., using as the alkali 1 to 8 mols of potassium hydroxide that contains 0 to 15% of water.

Some of the compounds accessible by the present process are known, others are new, among others the compounds of the formula

(40) 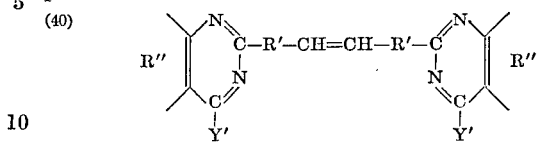

in which R″ represents a residue bond through a monocyclic benzene ring with the diazine ring, R′ represents a benzene residue Y′ linked in the 1,4-position with the diazine ring and the group —CH=, and Y′ is a hydrogen atom or a benzene residue; furthermore oxazole compounds of the formula

(41) 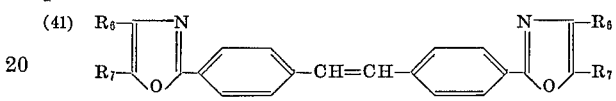

in which $R_6$ represents a hydrogen atoms or a phenyl radical and $R_7$ a phenyl radical.

Provided the new compounds of the Formulae 40 and 41 do not contain any chromophoric groups they can be used as they are as optical brighteners for a wide variety of organic materials. The new compounds may contain, or be free from, acid groups imparting solubility in water. More especially in the latter case they are suitable for optically brightening polyamides, polyolefines, cellulose esters (for example cellulose triacetate or so-called 2½-acetate), polyvinylchloride or especially polyesters. These compounds may be added as brighteners to the said material before or during the shaping of the latter. Thus, for example, in the manufacture of films or other shaped materials they may be added to the moulding composition or they may be dissolved, dispersed or in other ways finely distributed in the spinning composition before spinning it. The optical brighteners may also be added to the starting substances, reaction mixtures or intermediate products used in the manufacture of fully synthetic or semisynthetic organic materials, thus also before or during the chemical reaction, for instance in the case of a polycondensation polymerization or polyaddition.

EXAMPLE 1

A mixture of 20.9 g. of 1-[benzoxazolyl-(2′)]-4-methylbenzene of the formula

(14) 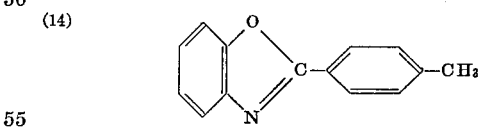

12.5 g. of powdered potassium hydroxide (containing about 10% of water) and 250 ml. of dimethylformamide is stirred. For 15 to 18 hours a current of dry air at the rate of 1 to 3 litres per hour is passed through the reaction mixture. At first, the batch turns reddish brown. When the initially exothermic reaction has subsided, the batch is heated to 50° to 60° C. On completion of the reaction 500 ml. of methanol are added to the reaction mixture which by then has turned brownish yellow; it is cooled to about 20° C., suctioned, and the filter residue is washed with methanol until neutral and dried, to yield about 11.2 g. (=54% of theory) of 4,4′-di-[benzoxazolyl-(2′)]-stilbene of the formula

(42) 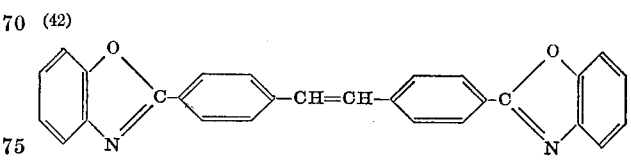

in the form of a yellow powder which melts above 360° C. After three recrystallizations from ortho-dichlorobenzene with the aid of bleaching earth there are obtained fine, brilliant greenish light-yellow, shiny needles melting at 362° to 363° C.

*Analysis.*—Calc'd for $C_{28}H_{18}O_2N_2$ (molecular weight 414.44) (percent): C, 81.14; H, 4.38; N, 6.76. Found (percent): C, 80.88; H, 4.41; N, 6.80.

When the 20.9 g. of 1-[benzoxazolyl-(2')]-4-methylbenzene of the Formula 14 are replaced by 26.5 g. of 1-[5'-tertiary butyl-benzoxazolyl-(2')]-4-methylbenzene of the formula

(15) 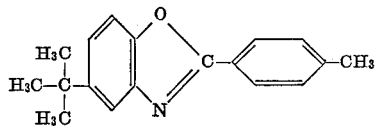

and the reaction is carried out with 25.0 g. of potassium

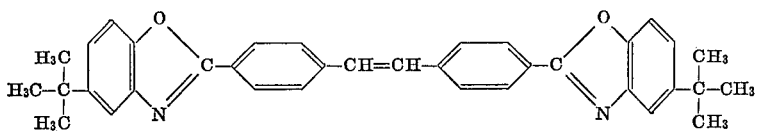

hydroxide, there are obtained about 8.7 g. (=33.1% of theory) of 4,4'-di-[5"-tertiary butyl-benzoxazolyl-(2")]-stilbene of the formula (43)

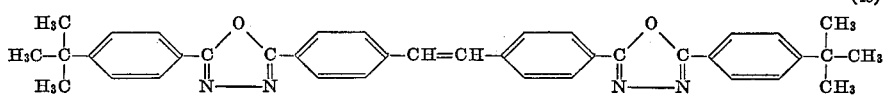

which after three recrystallizations from tetrachloroethylene with the aid of bleaching earth forms bright, greenish yellow, shiny flakes melting at 320° to 320.5° C.

*Analysis.*—Calc'd for $C_{36}H_{34}O_2N_2$ (molecular weight 526.65) (percent): C, 82.10; H, 6.51; N, 5.32. Found (percent): C, 81.97; H, 6.55; N, 5.29.

When the 25.0 g. of potassium hydroxide are replaced by 25.0 g. of sodium hydroxide, there are obtained 1.6 g. (=6.1% of theory) of 4,4'-di-[5"-tertiary butyl-benzoxazolyl-(2")]-stilbene of the Formula 43.

EXAMPLE 2

A mixture of 26.5 g. of 1-[5'-tertiary butyl-benzoxazolyl-(2')]-4-methylbenzene of the Formula 15, 50 g. of powdered potassium hydroxide (containing about 10% of water) and 300 ml. of dimethylformamide is stirred. Without supplying external heat (20° C.) a current of dry air at the rate of 1 to 3 litres per hour is passed through the reaction mixture for 21 hours. During the first 2½ hours the temperature rises by about 7° C. and then drops again gradually to the initial value. On completion of the reaction the yellow-brown reaction product is diluted with 300 ml. of methanol, suctioned, and the residue washed with methanol and water until neutral, and dried, to yield about 6.0 g. (=22.8% of theory) of 4,4'-di-[5"-tertiary butyl-benzoxaxolyl-(2")]-stilbene of the Formula 43 as a light yellow powder melting at 311° to 312° C.

EXAMPLE 3

A mixture of 29.2 g. of 2-[4'-tertiary butyl-phenyl-(1')]-5-[4"-methyl-phenyl-(1")]-1,3,4-oxdiazole of the formula

(44) 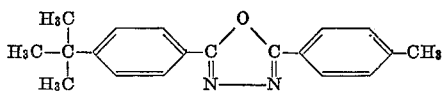

25.0 g. of powdered potassium hydroxide (containing about 10% of water) and 300 ml. of dimethylformamide is stirred. A current of dry air is passed through the reaction mixture for 15 to 18 hours at the rate of 1 to 3 litres per hour. At first the batch turns red. When the initially exothermic reaction has subsided, the whole is heated to 55° to 56° C. On completion of the reaction 300 ml. of methanol are added to the reaction mixture which by now has turned yellow. The batch is cooled to about 10° C., suction filtered, and the residue is washed neutral with methanol and dried, to yield about 12.4 g. (=42.7% of theory) of 4,4'-di-[5"-para-tertiary butyl-phenyl-1",3",4"-oxdiazolyl-(2)]-stilbene of the formula (45)

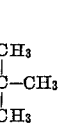

in the form of a light yellow powder which melts at 345° to 352° C. After three recrystallizations from ortho-dichlorobenzene with the aid of bleaching earth there are obtained bright, greenish yellow, shiny crystals melting at 350° to 350.5° C.

*Analysis.*—Calc'd for $C_{38}H_{36}O_2N_4$ (molecular weight 580.70) (percent): C, 78.59; H, 6.25; N, 9.65. Found (percent): C, 78.52; H, 6.40; N, 9.79.

When 2-[4'-tertiary butyl-phenyl-(1')]-5-[4"-methyl-phenyl-(1")]1,3,4-oxdiazole of the Formula 44 is replaced by an equimolecular quantity of 2-[4'-methoxy-phenyl - (1')]-5-[4"-methyl-phenyl-(1")]-1,3,4-oxdiazole of the formula

(46) 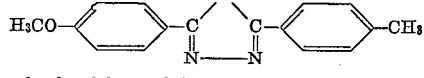

there is obtained in a yield of about 25% of the theoretical 4,4' - di-[5"-para-methoxy-phenyl-1",3",4"-oxdiazolyl (2")]-stilbene of the formula (47)

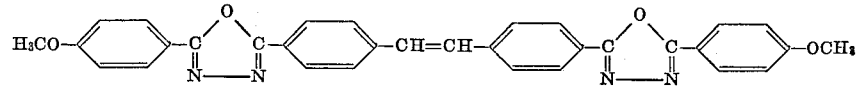

After three recrystallizations from ortho-dichlorobenzene with the aid of bleaching earth there are obtained bright, greenish yellow crystals melting at 293.5° to 294.5° C.

*Analysis.*—Calc'd for $C_{32}H_{24}O_4N_4$ (molecular weight 538.54) (percent): C, 72.71; H, 4.58; N, 10.60. Found (percent): C, 72.68; H, 4.71; N, 10.48.

EXAMPLE 4

A mixture of 12.2 g. of 2-[thienyl-(2')]-5-[4"-methyl-phenyl-(1")]-1,3,4-thiadiazole of the formula

(48) 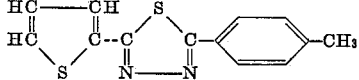

12.5 g. of powdered potassium hydroxide (containing about 10% of water) and 200 ml. of dimethylformamide is stirred. A current of dry air is passed through the reaction mixture for 22 hours at a rate of 1 to 2 litres per hour. At first the reaction mixture turns dark violet. When the initially exothermic reaction has subsided, the batch is heated to 55° to 60° C. On completion of the reaction 300 ml. of methanol are added to the light-yellow reaction mixture; it is cooled to about 10° C., suctioned, and the filter residue is washed with methanol and then with water till the washings run neutral, and dried, to yield about 2.25 g. (=17.2% of theory) of 4,4'-di-[thienyl-(2''')-1'',3'',4''-thiadiazolyl-(2'')]-stilbene of the formula (49)

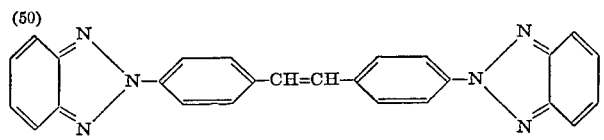

in the form of a yellow powder. After three recrystallizations from ortho-dichlorobenzene with the aid of bleaching earth there are obtained light yellow, shiny crystals melting at 346.5° to 347.5° C.

*Analysis.*—Calc'd. for $C_{26}H_{16}N_4S_4$ (molecular weight 512.70) (percent): C, 60.91; H, 3.15; N, 10.93. Found (percent): C, 61.17; H, 3.39; N, 10.88.

EXAMPLE 5

A mixture of 10.46 g. of the compound of the formula (12)

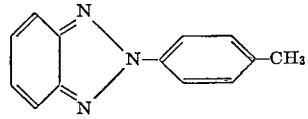

12.5 g. of powdered potassium hydroxide (containing about 10% of water) and 200 ml. of dimethylformamide is stirred. A current of dry air is passed through for 20 to 22 hours at a rate of 1 to 3 litres per hour, while maintaining the temperature at 55° to 57° C. Gradually, a solid brownish yellow substance forms. On completion of the reaction 300 ml. of methanol are added; the batch is suctioned, washed neutral with methanol and dried, to yield about 2.1 g. (=20.3% of theory) of the compound of the formula (50)

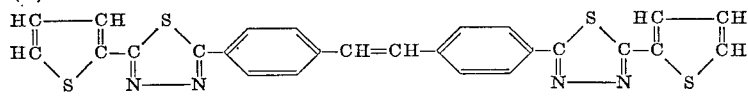

in the form of a yellow powder. After three recrystallizations from ortho-dichlorobenzene with the aid of bleaching earth there are obtained brilliant greenish light-yellow, shiny crystals melting at 377.5° to 378.5° C.

*Analysis.*—Calc'd for $C_{26}H_{18}N_6$ (molecular weight 414.45) (percent): C, 75.34; H, 4.38; N, 20.28. Found (percent): C, 75.18; H, 4.38; N, 20.35.

EXAMPLE 6

A mixture of 16.15 g. of 5,6-diphenyl-3-[4'-methyl-phenyl-(1')]-1,2,4-triazine of the formula (20)

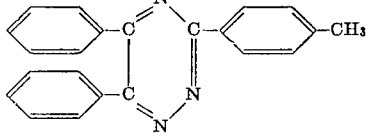

12.5 g. of powdered potassium hydroxide (containing about 10% of water) and 200 ml. of dimethylformamide is stirred. A current of dry air is passed through the reaction mixture for 20 hours at a rate of 1 to 3 litres per hour, and in the course of 3 hours the temperature is raised to 55° to 58° C. and thus maintained till the end of the reaction. The yellow reaction mixture is then diluted with 300 ml. of methanol and cooled to about 100° C., suctioned, washed neutral with methanol and dried, to yield about 3.05 g. (=19% of theory) of 4,4'-di-[5'',6''-diphenyl-1'',2'',4''-triazine-3''-yl]stilbene of the formula (51)

in the form of a yellow powder melting at 343° to 346° C. After three recrystallizations from ortho-dichlorobenzene with the air of bleaching earth there are obtained yellow, very fine crystals melting at 348° to 348.5° C.

*Analysis.*—Calc'd for $C_{44}H_{30}N_6$ (molecular weight 642.77) (percent): C, 82.22; H, 4.70; N, 13.08. Found (percent): C, 81.88; H, 4.54; N, 13.03.

When the 16.15 g. of 5,6-diphenyl-3-[4'-methyl-phenyl-(1')]-1,2,4-triazine of the Formula 20 are replaced by 16.15 g. of 2,4-diphenyl-6-[4'-methyl-phenyl-(1')]-1,3,5-triazine of the formula (52)

there are obtained about 6.55 g. (=40.8% of theory) of 4,4' - di-[2'',4''-diphenyl-1'',3'',5''-triazine-6''-yl]-stilbene of the formula (53)

which after repeated recrystallization from ortho-dichlorobenzene with the aid of bleaching earth forms very fine, light yellow needles melting at 357° to 360° C.

*Analysis.*—Calc'd for $C_{44}H_{30}N_6$ (molecular weight 642.77) (percent): C, 82.22; H, 4.70; N, 13.08. Found (percent): C, 82.06; H, 4.76; N, 12.68.

EXAMPLE 7

A mixture of 29.6 g. of 2-[4'-methyl-phenyl-(1')]-4-phenyl-quinazoline of the formula (54)

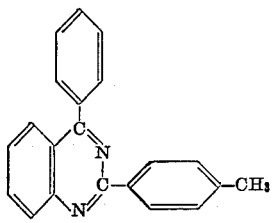

25 g. of powdered potassium hydroxide (containing about 10% of water) and 300 ml. of dimethylformamide is stirred. A current of dry air is passed through the reaction mixture for 15 to 18 hours at 55° to 57° C. at a rate of 1 to 3 litres per hour. On completion of the reaction the yellow batch is diluted with 300 ml. of methanol and cooled to about 10° C., suctioned, washed with methanol and then with water until neutral and dried, to yield about 15.9 g. (=53.8% of theory) of the stilbene derivative of the formula (55)

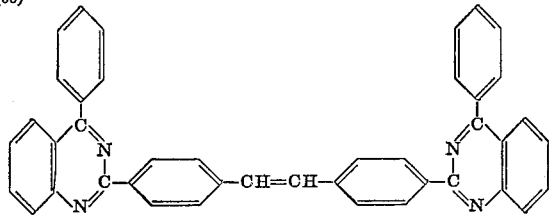

in the form of a light yellow powder. After three recrystallizations from dimethylformamide and then from ortho-dichlorobenzene with the aid of bleaching earth there are obtained light yellow, fine needles melting at 335° to 335.5° C.

*Analysis.*—Calc'd for $C_{42}H_{28}N_4$ (molecular weight 588.68) (percent): C, 85.69; H, 4.79; N, 9.52. Found (percent): C, 85.85; H, 4.74; N, 9.71.

EXAMPLE 8

A mixture of 15.57 g. of 2-[4'-methyl-phenyl-(1')]-4,5-diphenyl-oxazole of the formula (56)

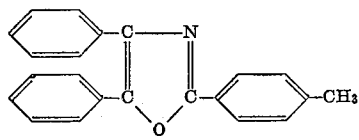

125 g. of powdered potassium hydroxide (containing about 10% of water) and 200 ml. of dimethylformamide is stirred. A current of dry air is passed for 16 hours through the reaction mixture at a rate of 1 to 3 litres per hour, while maintaining the reaction temperature at 40° to 45° C. On completion of the reaction 50 ml. of water and 200 ml. of methanol are added to the reaction mixture which has now turned light yellow. The batch is then cooled to about 10° C., suctioned and the residue washed with water and methanol until the washings run neutral, and dried, to yield about 3.8 g. (=24.5% of theory) of 4,4'-di-[4'',5''-diphenyl-oxazolyl-(2'')]-stilbene of the formula (57)

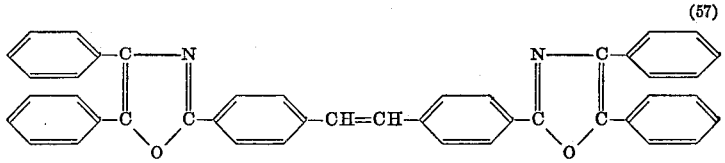

in the form of greenish yellow, felted needles melting at 289.5° to 290° C. After three recrystallizations from xylene the product melts at 292° C.

*Analysis.*—Calc'd for $C_{44}H_{30}O_2N_2$ (molecular weight 618.70) (percent): C, 85.41; H, 4.89; N, 4.53. Found: (percent): C, 85.25; H, 4.94; N, 4.33.

EXAMPLE 9

100 grams of polyester granulate from polyterephthalic acid ethyleneglycol ester are intimately mixed with 0.1 g. of the compound of the Formula 55 or 57 and then melted at 285° C. with stirring. The melt is spun through conventional spinnerets and the filament thus spun is stretched, whereby appreciably brightened polyester fibres are obtained.

Alternatively, the compound of the Formula 55 or 57 may be added to the starting materials before or during the polycondensation leading to the polyester.

What is claimed is:

1. A compound of the formula

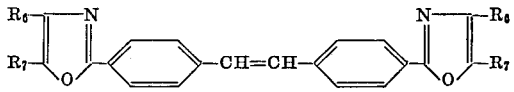

in which $R_6$ represents a hydrogen atom or a phenyl group and $R_7$ a phenyl radical.

2. The compound of the formula

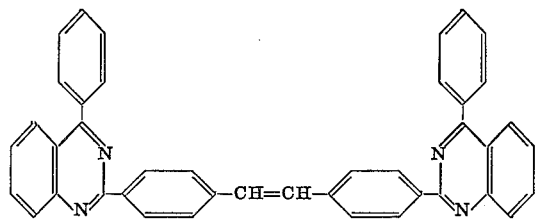

3. A process for the manufacture of symmetrical heterocyclic substituted stilbenes which comprises reacting a compound of the formula:

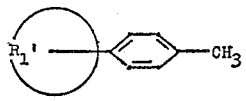

wherein $R_2'$ represents a heterocyclic system which contains a heterocyclic radical selected from the group consisting of a triazole radical, an oxazole radical, and a diazine radical; a said radical condensed with benzene ring; a said radical condensed with a naphthalene ring; an oxadiazole radical, a thiadiazole radical, and a triazine radical, the heterocyclic radicals being free of hydrogen atoms which are bonded to nitrogen atoms and which are replaceable by alkali metal, with molecular oxygen in dimethylformamide in the presence of an alkali selected from the group consisting of sodium hydroxide and potassium hydroxide containing from 0 to 15% by weight of water at a temperature of between 10° and 150° C.

4. Process according to claim 3, wherein the reaction with molecular oxygen is performed in dimethylformamide as solvent at a temperature from 30° to 100° C. and in the presence of 1 to 8 mols of potassium hydroxide which may contain 0 to 15% by weight of water.

5. A process according to claim 3 wherein the starting compound used is a compound of the formula

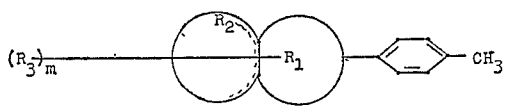

wherein $R_2$ represents the benzo or naphtho residue, $R_1$ indicates a 2-triazolyl(1.2.3), 2-oxazolyl or 2-diazinyl)-(1.3) moiety and $R_3$ is a member selected from the group consisting of hydrogen, alkyl with 1 to 6 carbon atoms except methyl groups in para-position, alkoxy with 1 to 4 carbon atoms, halogen and phenyl and $m$ stands for the integer 1, or $m$ is an integer from 1 to 4 provided $R_3$ stands for alkyl, or $m$ is an integer from 1 to 2 provided $R_3$ stands for alkoxy.

6. A process according to claim 3 wherein the starting compound used is a compound of the formula

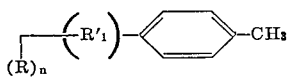

in which $R_1'$ is 2-oxazolyl, 2-oxadiazolyl, 2-thiadiazolyl, 2-(as)triazinyl, 2-s-triazinyl, 2- or 1-triazolyl-(1.2.3) and $R_3$ is selected from the group consisting of hydrogen, phenyl, naphthyl, thienyl, alkyl containing 1 to 6 carbon atoms and substituted phenyl wherein the substituent is a member selected from the group consisting of 1 to 4 alkyl groups with 1 to 6 carbon atoms except methyl groups in para-position, 1 to 2 alkoxy groups with 1 to 4 carbon atoms, and halogen, $n$ is 0 or an integer from 1 to $q$, where $q$ is the number of hydrogen atoms attached to carbon atoms on $R_1'$.

7. A process according to claim 3 wherein the starting compound used is a compound of the formula

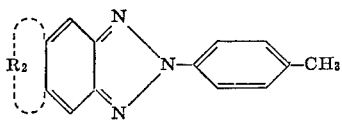

wherein $R_2$ is hydrogen or benzo.

8. A process according to claim 3, wherein the starting material used is a compound of the formula

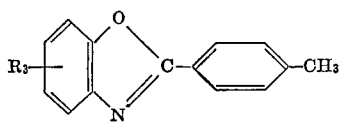

wheren $R_3$ is hydrogen or alkyl containing from 1 to 6 carbon atoms.

9. A process according to claim 3, wherein the starting material used is a compound of the formula

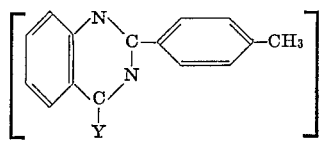

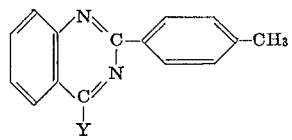

wherein Y is hydrogen or phenyl.

10. A process according to claim 3, wherein the starting material is a compound of the formula

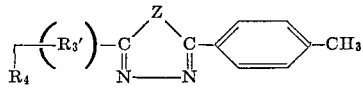

wherein $R_3'$ is phenyl, diphenyl, naphthyl and thienyl, and $R_4$ is hydrogen, or alkyl of from 1 to 6 carbon atoms and the Z is oxygen or sulphur.

11. A process according to claim 3, wherein the starting material used is a compound of the formula

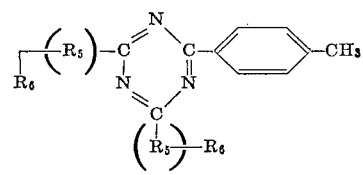

wherein $R_5$ is phenyl or diphenyl, $R_6$ is hydrogen or alkyl of from 1 to 6 carbon atoms, provided that where $R_5$ is diphenyl, $R_6$ is hydrogen.

References Cited

UNITED STATES PATENTS 2,483,392   10/1949   Meyer et al. _____ 260—240

FOREIGN PATENTS 642,303   6/1962   Canada _____ 260—240
1,378,454   10/1964   France _____ 260—240

OTHER REFERENCES

Drefahl et al.: Chem. Ber., vol. 93, pp. 492 to 497 (1960).

Smith et al.: General Chemistry, p. 344, revised edition copyrighted 1936, by D. Appleton-Century Co., N.Y.

JOHN D. RANDOLPH, Primary Examiner

U.S. Cl. X.R.

260—78, 92.8, 80, 37, 308, 307, 302, 310, 309, 283, 251, 290, 250; 252—301.2; 117—33.5; 106—176, 165

PO-1050
(5/69)

UNITED STATES PATENT OFFICE
CERTIFICATE OF CORRECTION

Patent No. 3,546,217          Dated December 8, 1970

Inventor(s) ADOLF EMIL SIEGRIST ET AL

It is certified that error appears in the above-identified patent and that said Letters Patent are hereby corrected as shown below:

Column 14, line 58, change "$R_2'$" to read -- $R_1'$ --.

Column 15, line 10, after "diazinyl" delete ")";
line 22, claim 6 in the formula, delete "$(R)_n$" and insert -- $(R_3)_n$ --.

Column 16, claim 9, delete the bracketed formula.

Signed and sealed this 24th day of August 1971.

(SEAL)
Attest:

EDWARD M. FLETCHER, JR.
Attesting Officer

WILLIAM E. SCHUYLER, JR.
Commissioner of Patents